United States Patent
Rahim et al.

(10) Patent No.: US 7,032,082 B1
(45) Date of Patent: Apr. 18, 2006

(54) CENTRALIZED MEMORY ALLOCATION WITH WRITE POINTER DRIFT CORRECTION

(75) Inventors: Rami Rahim, Sunnyvale, CA (US); Pradeep Sindhu, Los Altos Hills, CA (US); Raymond Marcelino Manese Lim, Los Altos Hills, CA (US); Sreeram Veeragandham, Sunnyvale, CA (US); David Skinner, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 754 days.

(21) Appl. No.: 09/942,623

(22) Filed: Aug. 31, 2001

(51) Int. Cl.
  *G06F 12/06* (2006.01)
  *G06F 13/16* (2006.01)
(52) U.S. Cl. ............................ 711/154
(58) Field of Classification Search ................ 711/154
  See application file for complete search history.

(56) References Cited

U.S. PATENT DOCUMENTS

| | | | | |
|---|---|---|---|---|
| 5,974,480 A | * | 10/1999 | Qureshi et al. | 710/27 |
| 6,145,027 A | * | 11/2000 | Seshan et al. | 710/22 |
| 2003/0156093 A1 | * | 8/2003 | Niida et al. | 345/156 |

* cited by examiner

*Primary Examiner*—B. James Peikari
*Assistant Examiner*—Woo H. Choi
(74) *Attorney, Agent, or Firm*—Harrity Snyder, LLP (57) ABSTRACT

A system for writing data includes a memory, at least one memory controller and control logic. The memory stores data units. The memory controller receives a write request associated with a data unit and stores the data unit in the memory. The memory controller also transmits a reply that includes an address where the data unit is stored. The control logic receives the reply and determines whether the address in the reply differs from an address included in replies associated with other memory controllers by a threshold amount. When this occurs, the control logic performs a corrective action to bring an address associated with the memory controller back within a defined range.

33 Claims, 10 Drawing Sheets

CENTRALIZED MEMORY ALLOCATION WITH WRITE POINTER DRIFT CORRECTION

BACKGROUND OF THE INVENTION

1. Field of the Invention

The present invention relates generally to memory management and, more particularly, to managing memory space.

2. Description of Related Art

Conventional network devices, such as routers, transfer packets through a network from a source to a destination. Typically, the network device receives packets from a number of different data streams and a memory subsystem stores the packets while the packets are processed. As the number of data streams supported by the network device increases, a number of components may be writing data to the memory subsystem simultaneously.

One drawback with this approach is that when multiple components are writing data to the same memory, one of the components may write to a memory location that has already been written to by another component. This may result in data associated with one data packet inadvertently overwriting data from another data packet.

Another drawback occurs as the number of data streams supported by the network device and the line rates increase. In this case, the network device must be able to process the data while maintaining the required line rate for each of the streams. Some network devices store the memory address locations identifying where the data associated with each of the data packets is stored (i.e., address pointers). As the memory size increases, however, the logistics associated with storing the address pointer information and forwarding this information to other systems/subsystems in the network device causes problems.

For example, as the size of the memory increases to support a large number of data streams, the size of the address pointers correspondingly increase. The space needed to store these address pointers for all the data streams becomes considerable. With chip space at a premium, the network device is often unable to store all this information. This may result in the network device dropping packets. In addition, forwarding the address pointer information to other systems/subsystems that need this information may cause delays when the address pointers become large.

SUMMARY OF THE INVENTION

Systems and methods consistent with the invention address these and other needs by using one or memory controllers to determine where to store data in a memory system. The memory system may include multiple memory devices and corresponding memory controllers. Multiple request engines may forward write requests to the memory controllers. Each memory controller may then determine where to store the data, thereby preventing two request engines from writing to the same location. Each memory controller may also send a reply indicating the location of the data in its associated memory device. Control logic may determine whether one or more of the memory controllers is writing data to address locations that differ from address locations in the other memory devices by more than a threshold value. When this occurs, the control logic may initiate corrective action to bring the offending memory controller back within a predetermined range.

In accordance with the principles of the invention as embodied and broadly described herein, a system for writing data includes a memory, at least one memory controller and control logic. The memory is configured to store data units. The memory controller is configured to receive a first write request associated with a data unit, store the data unit in the memory and transmit a first reply including a first address where the data unit is stored. The control logic is configured to receive the first reply and determine whether the first address differs from an address included in at least one other reply by at least a first value.

In another implementation consistent with the principles of the invention, a method for writing data in a network device is provided. The method includes generating write requests, where each write request includes at least one data unit and a number of the data units comprise a data packet. The method also includes forwarding the write requests to one of a plurality of memory controllers, where each memory controller includes an address register. The method further includes determining, by a first one of the memory controllers, where to store the data unit using its address register, storing the data unit at a location identified by the address register and incrementing the address register.

In a further implementation consistent with the principles of the invention, a system for writing data is provided. The system includes a number of memory banks, a write request engine, a number of memory controllers and control logic. The memory banks are configured to store data units, where a number of the data units comprise data packets and at least some of the data units associated with a first data packet are stored in different memory banks. The write request engine is configured to generate write requests, where each write request includes a data unit. The memory controllers correspond to the memory banks and each memory controller includes an address register. A first memory controller is configured to receive a first write request, store the data unit included in the first write request in a first one of the memory banks, increment its address register and transmit a first reply including a write pointer that identifies an address where the data unit is stored. The control logic is configured to receive the first reply and determine a difference between the write pointer in the first reply and write pointers included in replies from each of the other memory controllers. The control logic is also configured to identify the maximum difference and determine whether the maximum difference is greater than a first threshold.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Exemplary Network Device Configuration

Figure 1:
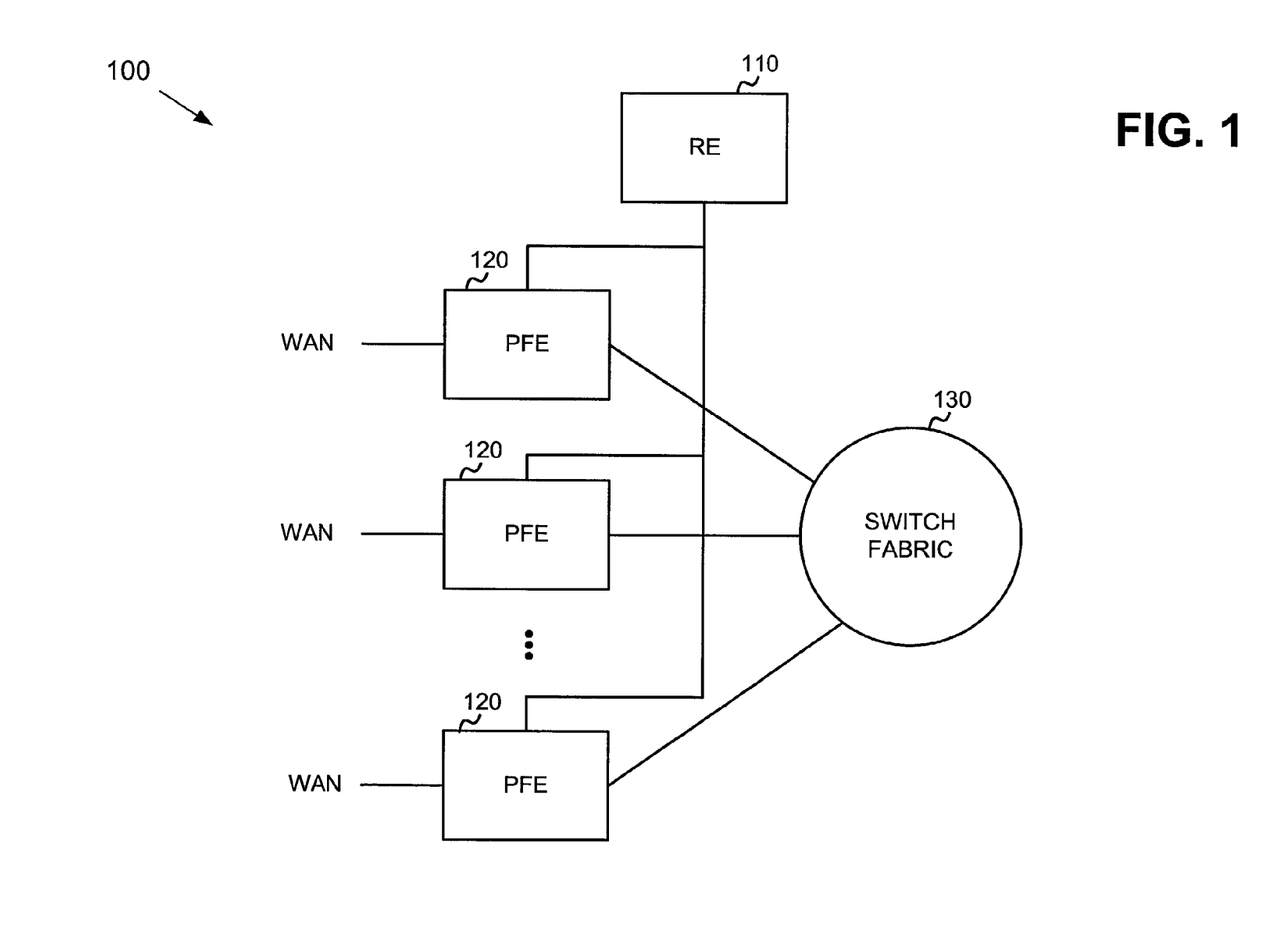
FIG. 1 is a diagram of an exemplary network device in which systems and methods consistent with principles of the invention may be implemented.

FIG. 1 is a diagram of an exemplary network device in which systems and methods consistent with the principles of the invention may be implemented. In this particular implementation, the network device takes the form of a router 100. Router 100 may receive one or more data streams from a physical link, process the data stream(s) to determine destination information, and transmit the data stream(s) on one or more links in accordance with the destination information.

Router 100 may include a routing engine (RE) 110 and multiple packet forwarding engines (PFEs) 120 interconnected via a switch fabric 130. Switch fabric 130 may include one or more switching planes to facilitate communication between two or more PFEs 120. In an implementation consistent with the present invention, each of the switching planes includes a three-stage switch of crossbar elements.

Routing engine 110 may include processing logic that performs high level management functions for router 100. For example, routing engine 110 may communicate with other networks and systems connected to router 100 to exchange information regarding network topology. Routing engine 110 may create routing tables based on the network topology information and forward the routing tables to PFEs 120. PFEs 120 may use the routing tables to perform route lookup for incoming packets. Routing engine 110 may also perform other general control and monitoring functions for router 100.

Each of PFEs 120 connects to routing engine 110 and switch fabric 130. PFEs 120 receive data on physical links connected to a network, such as a wide area network (WAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

Figure 2:
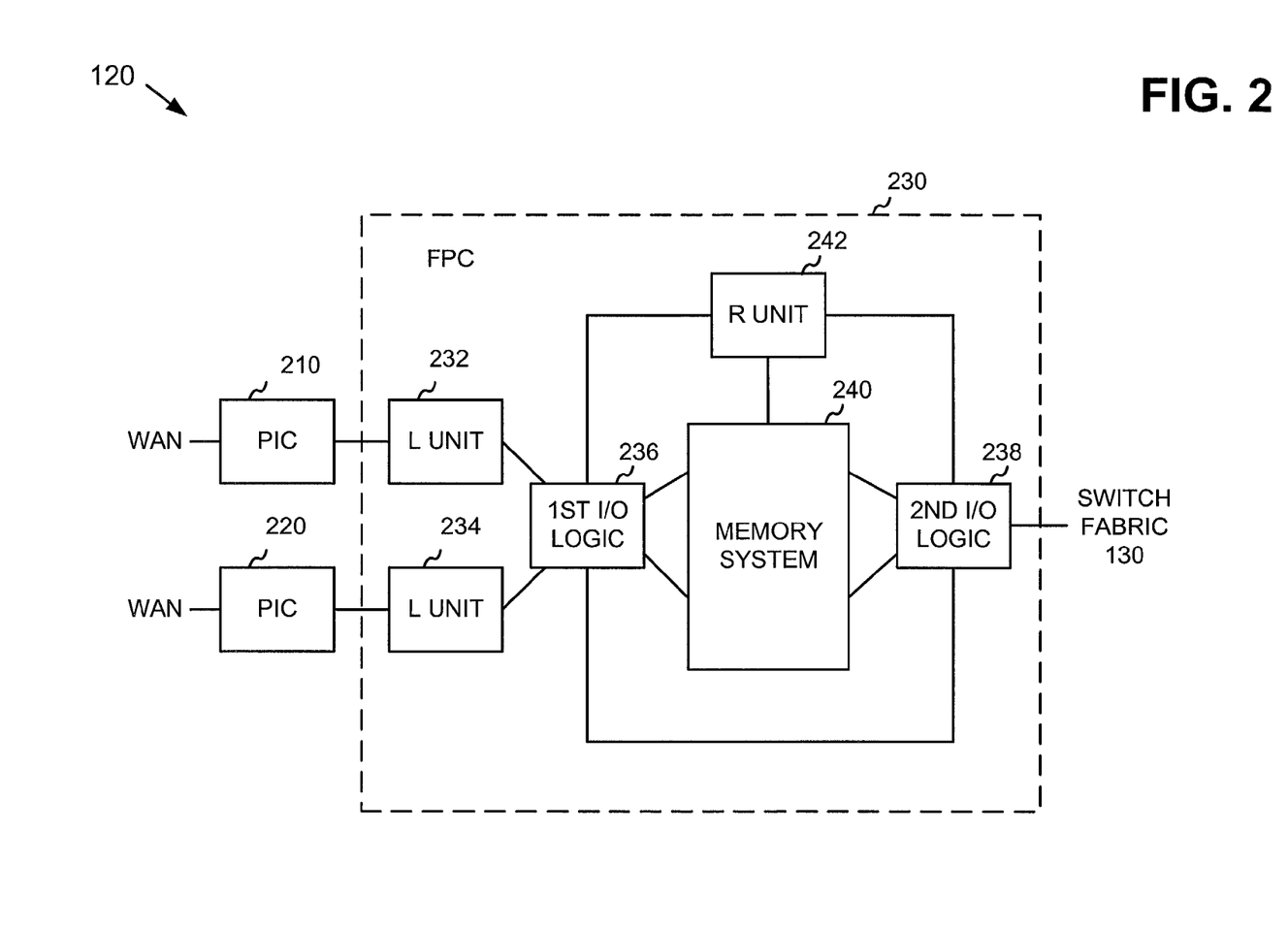
FIG. 2 is an exemplary diagram of a packet forwarding engine (PFE) of FIG. 1 according to an implementation consistent with principles of the invention.

FIG. 2 is an exemplary diagram of a PFE 120 according to an implementation consistent with the principles of the invention. PFE 120 may include physical interface cards (PICs) 210 and 220 connected to a flexible port concentrator (FPC) 230. While two PICs 210 and 220 are shown in FIG. 2, there may be more or less PICs in other implementations.

PICs 210 and 220 connect to WAN physical links and FPC 230 and transport data between the WAN physical links and FPC 230. Each of PICs 210 and 220 includes interfacing, processing, and memory elements necessary to transmit data between a WAN physical link and FPC 230. Each of PICs 210 and 220 is designed to handle a particular type of physical link. For example, a particular PIC may be provided to handle only Ethernet communications.

For incoming data, PICs 210 and 220 may strip off the layer 1 (L1) protocol information and forward the remaining data, raw packets, to FPC 230. For outgoing data, PICs 210 and 220 may receive packets from FPC 230, encapsulate the packets in L1 protocol information, and transmit the data on the physical WAN link.

FPC 230 performs packet transfers between PICs 210 and 220 and switch fabric 130. For each packet it handles, FPC 230 may perform route lookup based on packet header information to determine destination information and send the packet either to PIC 210 and 220 or switch fabric 130, depending on the destination information.

FPC 230 may include L units 232 and 234, first input/output (I/O) logic 236, second input/output (I/O) logic 238, memory system 240, and R unit 242. Each of L units 232 and 234 corresponds to one of PICs 210 and 220. L units 232 and 234 may process packet data flowing between PICs 210 and 220, respectively, and first I/O logic 236. Each of L units 232 and 234 may process data flowing in two directions: a first direction corresponding to processing packet data received from PIC 210 or 220 and a second direction corresponding to processing packet data received from first I/O logic 236.

In the first direction, L unit 232 or 234 may process packets from PIC 210 or 220, respectively, convert the packets into data (D) cells, and transmit the D cells to first I/O logic 236. D cells are the data structure used internally by FPC 230 for transporting and storing data. In one implementation, D cells are 64 bytes in length.

Packets received by L unit 232 or 234 may include two portions: a header portion and a packet data portion. For each packet, L unit 232 or 234 may process the header and insert the results of the processing into the D cells. The results may include packet header information and, possibly, other packet-related information. For example, L unit 232 or 234 may parse L2 and L3 headers of incoming packets and insert the results in the D cells. The results might include some of the original header information, as well as processed header information. L unit 232 or 234 may also create control information based on the packet. The control information may be based on the packet header, the packet data, or both. L unit 232 or 234 may then store the results, control information, and the packet data in D cells, which it sends to first I/O logic 236.

In the second direction, L unit 232 or 234 handles data flow in the opposite direction to the first direction. In the second direction, L unit 232 or 234 receives D cells from first I/O logic 236, extracts certain fields and packet data from the D cells, and creates a packet based on the extracted information. L unit 232 or 234 creates the packet header from the fields extracted from the D cells. L unit 232 or 234 may load the packet data portion with the packet data from the D cells.

First I/O logic 236 and second I/O logic 238 coordinate data transfers into and out of FPC 230. First I/O logic 236 receives D cells from L units 232 and 234, and second I/O logic 238 receives D cells from switch fabric 130. Upon receiving D cells for a packet, the I/O logic extracts certain fields from the D cells and creates a notification based on the extracted fields.

First I/O logic 236 and second I/O logic 238 store the D cells in memory system 240. The location of each D cell is also stored in the notification. In one implementation, instead of storing addresses in the notification, only the address of the first D cell is stored in the notification, and the remaining D cell locations are identified in the notification by offsets from the first address. If the notification cannot store all the D cell addresses, the overflow D cell addresses are stored in memory system 240 in indirect address cells (I cells). After storing the D cells and I cells for a packet in memory system 240, first I/O logic 236 and second I/O logic 238 send a notification to R unit 242. While first I/O logic 236 and second I/O logic 238 are shown as separate units, they may be implemented as a single unit in other implementations consistent with principles of the invention.

R unit 242 may include processing logic that provides route lookup, accounting, and policing functionality. R unit 242 may receive one or more forwarding tables from RE 110 (FIG. 1) and uses the forwarding table(s) to perform route lookups. R unit 242 may insert the lookup result into a notification received from first I/O logic 236 or second I/O logic 238, which it may store in memory system 240.

Figure 3:
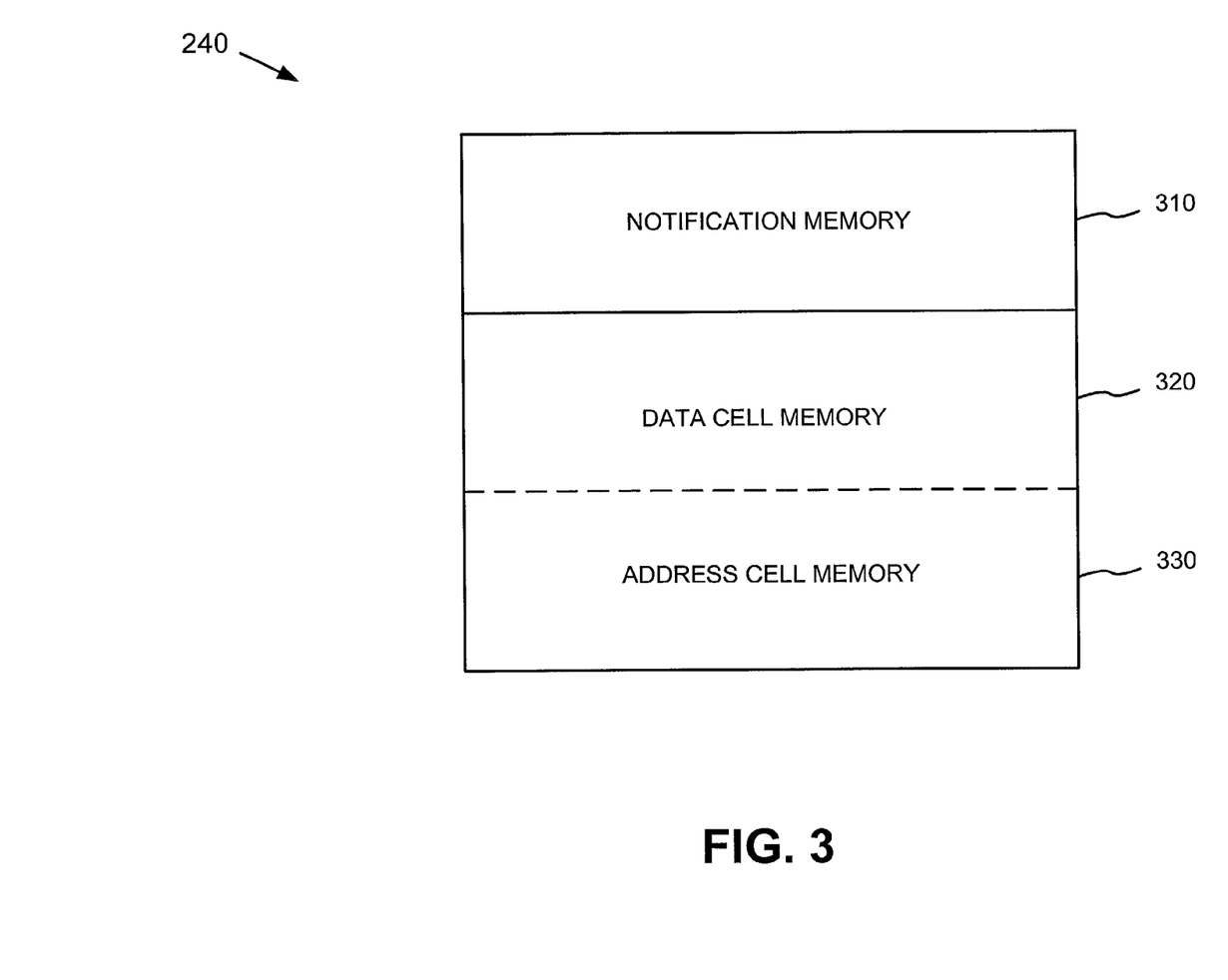
FIG. 3 is an exemplary diagram of the memory system of FIG. 2 according to an implementation consistent with principles of the invention.

Memory system 240 may temporarily store data from first I/O logic 236 and second I/O logic 238 and notifications from R unit 242. FIG. 3 is an exemplary diagram of a portion of memory system 240 according to an implementation consistent with the principles of the invention. Memory system 240 may be implemented as one or more memory devices and may include a notification memory 310, a data cell memory 320, and an address cell memory 330. In an exemplary implementation consistent with principles of the invention, two or more of the memories, such as data cell memory 320 and address cell memory 330, may be implemented as a single memory device, as indicated by the dashed lines in FIG. 3.

Figure 4:
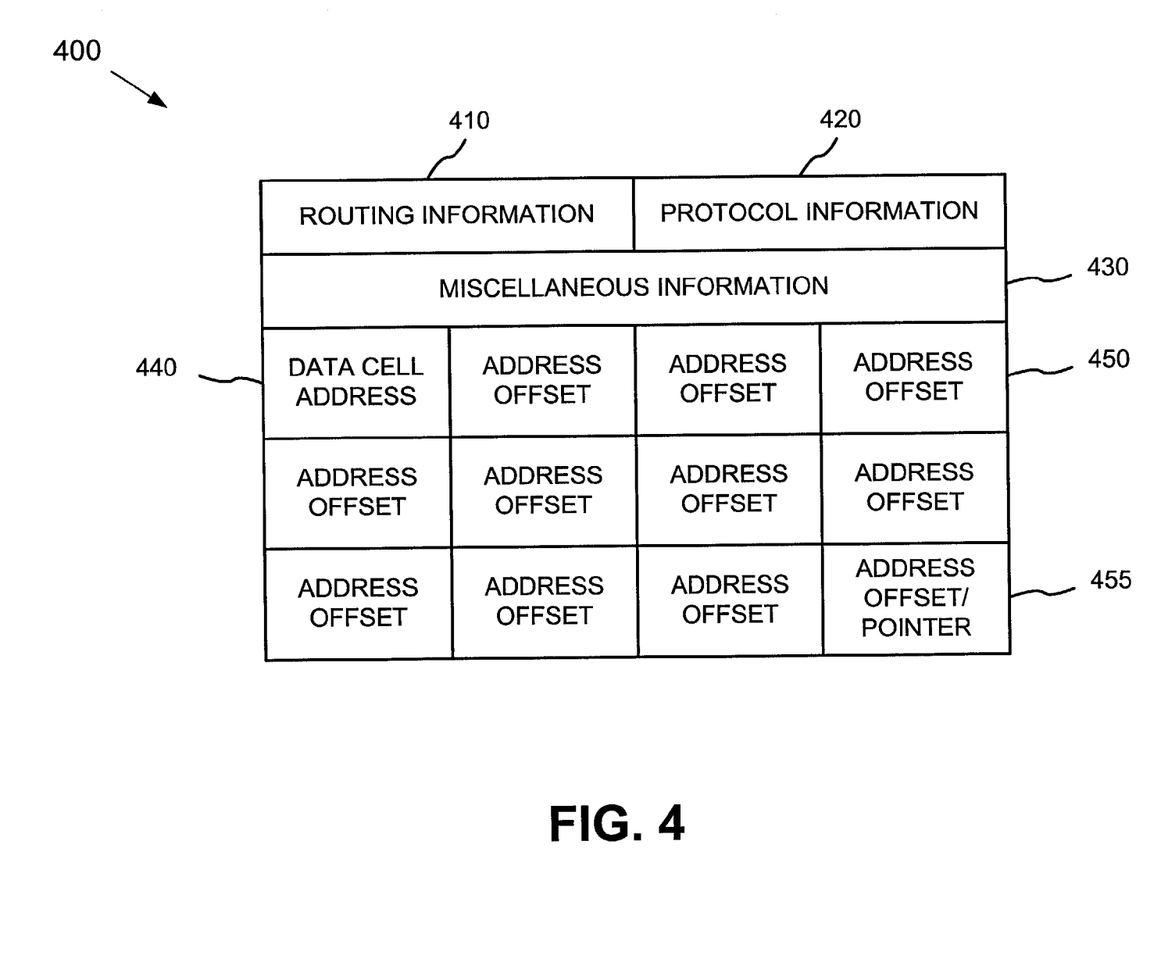
FIG. 4 is an exemplary diagram of a notification according to an implementation consistent with principles of the invention.

Notification memory 310 may store notifications from R unit 242. FIG. 4 is an exemplary diagram of a notification 400 according to an implementation consistent with principles of the invention. Notification 400 may include several fields, such as a routing information field 410, a protocol information field 420, miscellaneous information field 430, a data cell address field 440 and address offset fields 450. Routing information field 410 may store information regarding a source, destination, input and output PICs, etc. of a packet. Protocol information field 420 may store information regarding the protocol associated with the packet. Miscellaneous information field 430 may store other packet-related information, such as quality of service (QoS), validity, priority, and data length.

Data cell address field 440 may store an actual address of a data cell stored in data cell memory 320. Address offset fields 450 store data that identify the addresses of the remaining data cells for the packet in data cell memory 320 based on their relationship to the actual address, or as offsets of the actual address. In another implementation consistent with the principles of the invention, address offset fields 450 store actual addresses of data cells in data cell memory 320.

One of address offset fields 450 (identified as address offset/pointer field 455) may store an address offset, similar to address offset fields 450, or a pointer to an I cell in address cell memory 330. Whether address offset/pointer field 455 stores an address offset or a pointer may be based on the size of the corresponding packet. For example, for large packets (i.e., packets having more data cells than the number of address offsets 450 in notification 400), address offset/pointer field 455 may store a pointer to an I cell in address cell memory 330. For small packets (i.e., packets having fewer data cells than the number of available address offsets 450 in notification 400), on the other hand, address offset/pointer field 455 may store an address offset, if necessary, as described above.

Returning to FIG. 3, data cell memory 320 may store data cells of a packet. In an implementation consistent with the principles of the invention, the data cells of a packet are stored at non-contiguous locations within data cell memory 320. For example, the data cell memory 320 may include a number of data banks. Data cells from one packet may be distributed among one or more of the memory banks, as described in more detail below.

Address cell memory 330 may store I cells that contain addresses (or address offsets) of data cells stored in data cell memory 320. A packet may have associated I cells when the number of data cells of the packet exceeds the number of address offsets 450 (FIG. 4) in notification 400.

Figure 5:
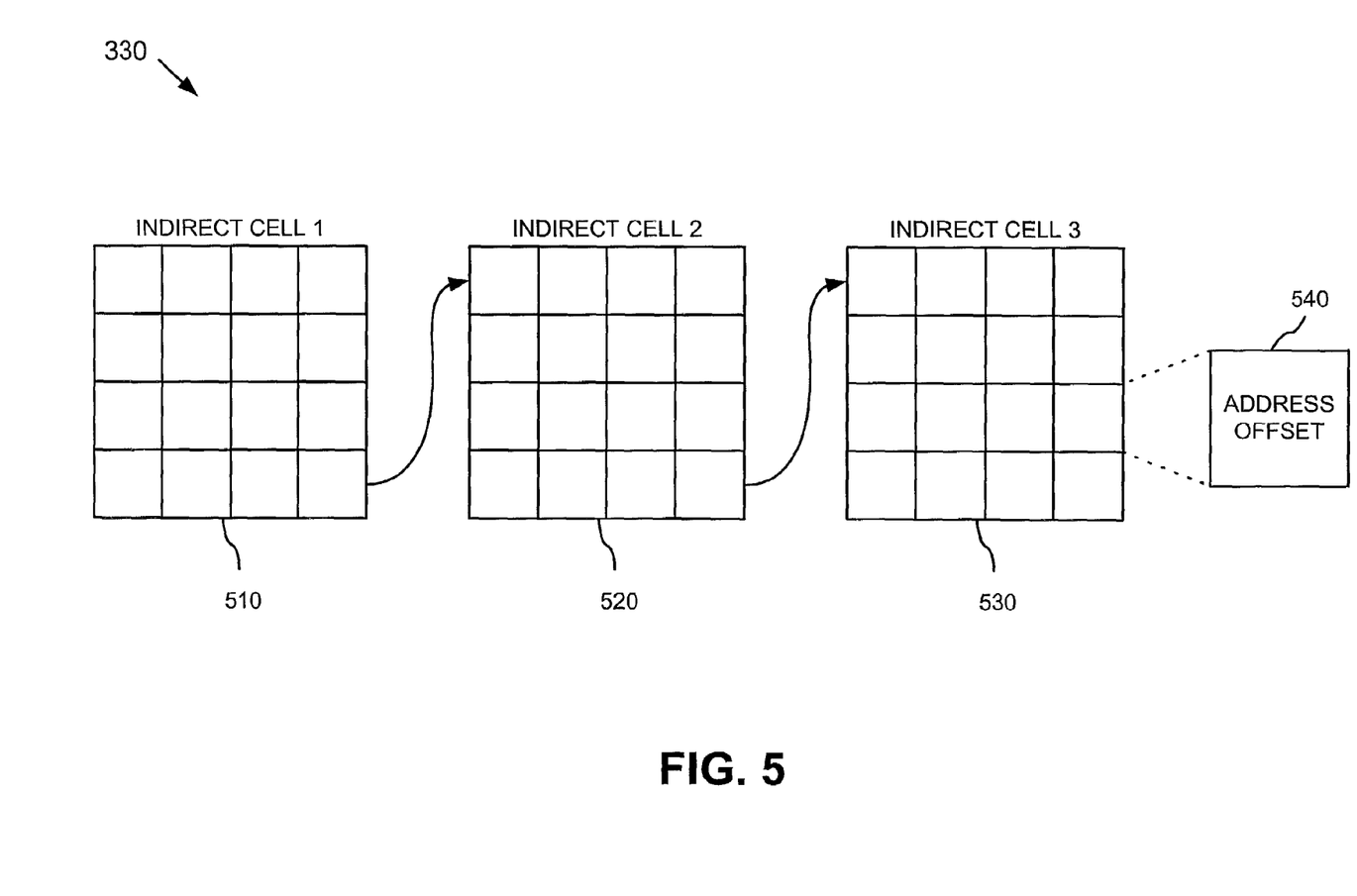
FIG. 5 is exemplary diagram of the address cell memory of FIG. 3 according to an implementation consistent with principles of the invention.

The I cells may be stored as a linked list within address cell memory 330. FIG. 5 is exemplary diagram of address cell memory 330 according to an implementation consistent with the principles of the invention. Address cell memory 330 may include multiple I cells, such as I cells 510–530. While three I cells 510–530 are shown in FIG. 5, there may be more or less I cells in other implementations consistent with the principles of the invention.

Each of I cells 510–530 may store multiple address offsets 540. Address offset 540 may store an address of one of the data cells within data cell memory 320 as an offset from the address of a previous data cell in a particular packet.

Figure 6:
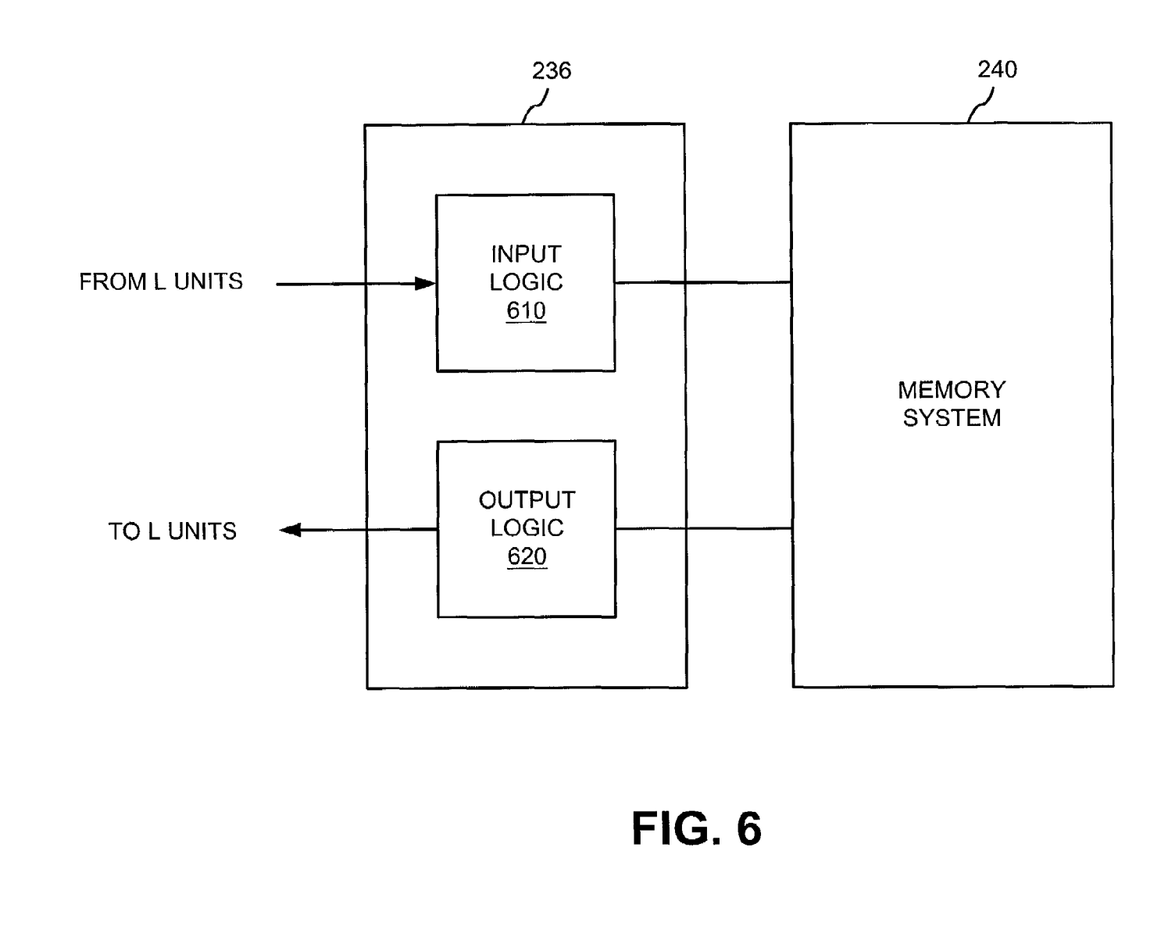
FIG. 6 is an exemplary diagram of the first I/O logic of FIG. 2 according to an implementation consistent with principles of the invention.

FIG. 6 is an exemplary diagram of first I/O logic 236, according to an implementation consistent with principles of the invention. Second I/O logic 238 may be configured in a similar manner. First I/O logic 236 includes input logic 610 and output logic 620. Input logic 610 receives D cells from L units 232 and 234, and writes the D cells to memory system 240. More particularly, input logic 610 may create a notification from information extracted from the D cells, write the D cells to memory system 240, store in the notification the address offsets identifying where the D cells were stored, and send the notification to R unit 242.

Output logic 620 handles data transfer in the direction opposite to input logic 610. Generally, output logic 620 receives notifications from memory system 240, reads D cells from memory system 240 based on the notification, and transfers the D cells to L units 232 and 234. It should be understood that input logic 610 and output logic 620 for second I/O logic 238 process data received from and output data to switch fabric 130 in a similar manner.

Figure 7:
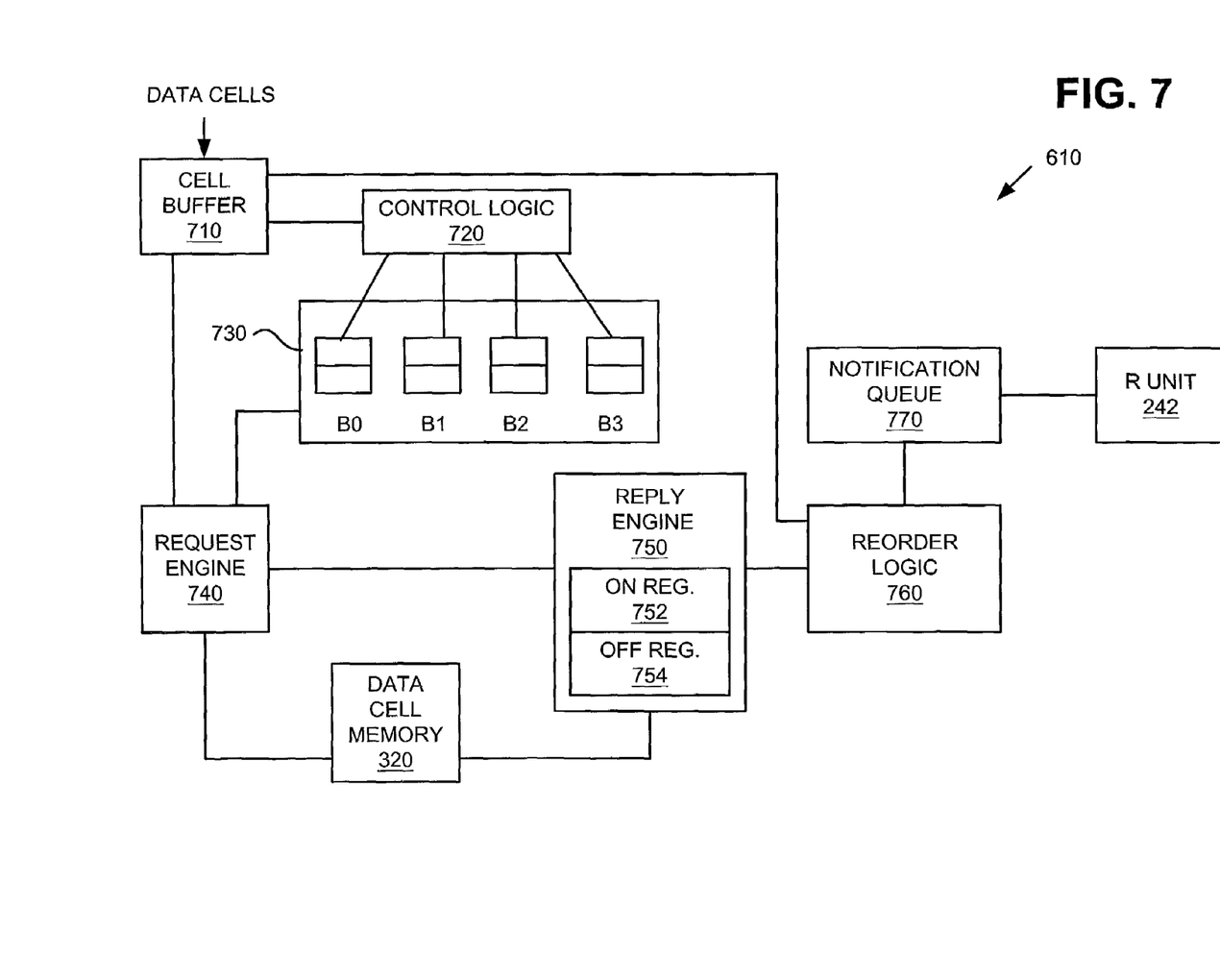
FIG. 7 is an exemplary diagram of the input logic of FIG. 6 according to an implementation consistent with principles of the invention.

FIG. 7 is an exemplary diagram illustrating a portion of input logic 610 according to an implementation consistent with principles of the invention, along with data cell memory 320 and R unit 242. Input logic 610 for second I/O logic 238 may be configured in a similar manner. Referring to FIG. 7, input logic 610 includes cell buffer 710, control logic 720, memory bank queue 730, request engine 740, reply engine 750, reorder logic 760 and notification queue 770.

Cell buffer 710 stores D cells received from L units 232 and 234. Control logic 720 receives control information associated with the D cells stored in cell buffer 710, such as sequence number information, location information identifying where the D cells are stored in cell buffer 710 and notification pointer information. Control logic 720 may also receive control information associated with I cells. Control logic 720 may use the sequence number information to determine the particular memory bank in data cell memory 320 to which a D cell will be written. For example, control logic 720 may map the least two significant bits of the sequence number to a memory bank. Alternatively, control logic 710 may randomly determine the memory bank to which the D cell will be written using other techniques.

Control logic 720 stores the D cell parameters and the I cell parameters in memory bank queue 730. As described previously, data cell memory 320 (FIG. 3) may include a number of memory banks. In an exemplary implementation consistent with principles of the invention, memory bank queue 730 includes four queues labeled B0–B3 that correspond to one of four memory banks in data cell memory 320. In other implementations, the number of memory banks in data cell memory 320 may be greater or smaller based on the user's requirements. Correspondingly, the number of queues in memory bank queue 730 may be greater or smaller. Each queue in memory bank queue 730 may include a queue for D cell information and a queue for I cell information. In alternative implementations, the D cell and I cell queues may be combined. In either case, control logic 720 spreads the data relatively evenly across the queues in memory bank queue 730 to ensure that the data will be evenly spread across the data banks in data cell memory 320.

Request engine 740 dequeues the entries in memory bank queue 730 and retrieves the D cells associated with the respective entries from cell buffer 710. Request engine 740 may then generate write requests and transmit the write requests to data cell memory 320. Requests associated with a particular queue in memory bank queue 730 are forwarded to the corresponding memory bank in data cell memory 320. For example, requests associated with queue B0 in memory bank queue 730 are forwarded to memory bank 0 in data cell memory 320, requests associated with B1 are forwarded to memory bank 1, and so on. A memory interface device (not shown) may receive the write requests from request engine 740 and pass them on to data cell memory 320.

Each write request, consistent with principles of the invention, includes the D cell and an identity number, such as sequence number information that identifies the D cell being sent to data cell memory 320. The write requests, however, do not identify a specific location in one of the memory banks in data cell memory 320. In an exemplary implementation, logic associated with each memory bank determines where to store the particular cells. That is, the logic for a particular memory bank allocates memory space in its memory bank for the D cells included in each of the write requests. This eliminates problems associated with multiple requesters writing to the same location in one of the memory banks. For example, write requests may be transmitted to data cell memory 320 from both first I/O logic 236 and second I/O logic 238. Having data cell memory 320 allocate the locations in each of its memory banks prevents a requestor, such as request engine 740 in first I/O logic 236, from overwriting data from a second requester, such as a write request engine in second I/O logic 238.

Figure 8:
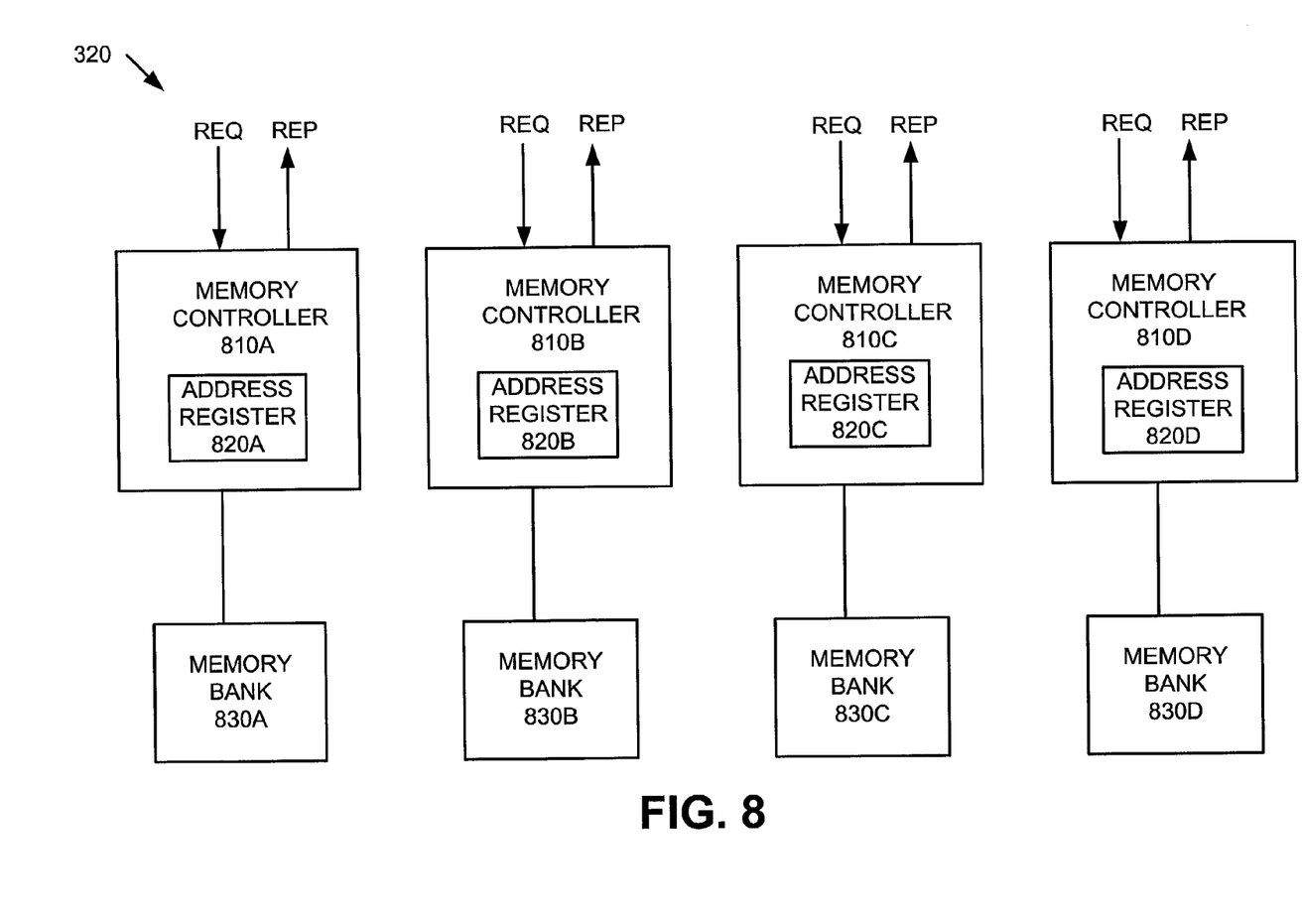
FIG. 8 is an exemplary diagram of the data cell memory of FIG. 3 according to an implementation consistent with principles of the invention.

FIG. 8 illustrates an exemplary data cell memory 320 consistent with principles of the invention. In the exemplary implementation illustrated, data cell memory 320 includes memory controllers 810A–810D, address registers 820A–820D and memory banks 830A–830D. In other implementations, data cell memory 320 may include more or fewer memory banks and corresponding controllers and address registers. Memory controllers 810A–810D receive write requests from request engine 740 and access address registers 820A–820D to identify the address of the next location in the respective memory banks 830A–830D where the D cells are to be stored. Memory controllers 810A–810D increment their respective address registers after each write operation. FIG. 8 illustrates a single request and a single reply being transmitted to/from each of memory controllers 810A–810D for simplicity. It should be understood that each of memory controllers 810A–810D may be coupled to multiple requesters and reply devices, respectively, that permit a number of requesters/reply devices to transmit write requests and receive replies to/from the memory controllers 810A–810D.

In an exemplary implementation, memory controllers 810A–810D increment the address register by "1" or "2," based on information included in the write request, as described in more detail below. This serves to maintain the current address in each of the respective address registers 820 within a defined range of each other. Preventing one or more of the address registers 820 from drifting ensures that the address offsets included in address offset fields 450 (FIG. 4) will not exceed a predetermined size.

Referring back to FIG. 7, reply engine 750 receives a reply from the appropriate memory controller 810 after the D cell is written in one of memory banks 830. The reply may include the original sequence number transmitted with the request so that reply engine 750 can match up the request with the reply. The reply may also include the address of where the D cell is stored in the particular memory bank 830 (i.e., a write pointer). Reply engine 750 forwards the write pointer included in the reply to reorder logic 760.

Reply engine 750, consistent with principles of the invention, also determines whether one of memory banks 830 is lagging the other memory banks with respect to the current address location where the D cells are being stored. For example, in normal situations, each of the memory controllers 810A–810D receives approximately the same number of data write requests. Therefore, in most cases, the current addresses in address registers 820A–820D are all tightly coupled (i.e., within a relatively narrow range). This means that when a number of D cells from the same packet are split up among the memory banks 830A–830D, the address offsets between the D cell locations will be fairly small.

However, when D cells are dropped prior to receipt by a memory controller 810, its corresponding address register 820 may not be incremented as often as the other address registers, resulting in this address register 820 lagging the other address registers. This may eventually result in increased address offset sizes. For example, suppose that four D cells from a single data packet are dequeued by request engine 740 for transmission to memory controllers 810A–D, respectively. Further assume that the D cell destined for memory bank 830B (i.e., D cell 2) gets dropped prior to transmission to memory controller 810B. D cells 1, 3 and 4 are received by memory controllers 810A, 810C and 810D, written to memory banks 830A, 830C and 830D and address registers 820A, 820C and 820D are incremented. Address register 820B, however, is not incremented since D cell 2 was not written to memory bank 830B. As this continues over time, an address register, such as address register 820B, may drift outside a predetermined range from the other address registers. Since D cells from the same packet may be split among memory banks 830A–D, writing D cells to address locations that vary widely increases the sizes of the address offsets.

To prevent one or more of the address registers 820 from drifting outside a defined range, reply engine 750 includes on register 752 and off register 754. These registers may be programmable by a user based on the user's requirements and the desired maximum size associated with address offset fields 450. Reply engine 750 monitors write reply addresses from each memory controller 810 and determines if the address register 820 of a particular memory controller 810 starts to drift from the other memory controllers 810. When the address register 820 of a memory controller 810 falls behind those of the other memory controllers 810 by an amount greater than the value in on register 752, reply engine 750 signals request engine 740 that corrective action must be taken.

For example, reply engine 750 may request that future write requests from request engine 740 to this particular memory controller 810 indicate that the memory controller 810 should increment its address register 820 by "2" after each write operation. In this manner, the lagging address register 820 will quickly "catch up" to the other address registers 820.

Alternatively, memory controller 810 with the lagging address register 820 may increment its address register 820 by "2" prior to writing the next D cell to the corresponding memory bank 830. In other implementations, the write requests from request engine 740 may indicate that other corrective action is required. For example, request engine 740 may indicate that the appropriate memory controller 810 should advance its address register 820 by a value greater than "2" before or after each write. Alternatively, request engine 740 may signal the appropriate memory controller 810 to increment its address register 820 by "X," before or after the next write, where X may be any number that places the lagging address register 820 back within the defined range.

When the reply engine 750 determines that the difference between the write reply address from the lagging memory controller 810 and the other memory controllers 810 is less than or equal to the value in off register 754, reply engine 750 may signal request engine 740 that normal write requests may resume and corrective action is no longer necessary. Alternatively, when the difference is less than the value in off register 754, reply engine 750 may provide no special signal to request engine 740, thereby indicating that no corrective action is necessary and normal write requests may resume.

Reorder logic 760 receives D cell control information, such as the write pointers identifying where the D cells are stored and the sequence number of the D cells, from reply engine 750. Reorder logic 760 reorders this D cell control information based on the sequence number. As the D cells' control information is reordered, reorder logic 760 generates address offsets that will be stored in address offset fields 450 of notifications 400 (FIG. 4) or in the I cells which are written to address cell memory 330 (FIG. 3). As described above, the size of the address offsets are minimized using on register 752 and off register 754, thereby ensuring that the actual address offset values will fit within address offset fields 450.

According to an exemplary implementation, the address offset fields 450 are 12 bits in size. In other implementations, the size of address offset fields 450 may be greater or smaller based on the particular user's requirements. In order to minimize the address offset size, the values in on/off registers 752 and 754 may be adjusted. For example, reducing the value in on register 752 may reduce the size of the address offsets.

Reorder logic 760 may also determine the true packet length of each packet, after any padded bytes are stripped, and insert this value into the notification. After reorder logic 760 finishes processing an entire packet, it forwards the start address (data cell address 440—FIG. 4), address offsets and notification pointers to notification queue 770. Notification data and key data associated with the packets may then be returned from a notification buffer (not shown), assembled into the appropriate notification format (i.e., notification 400) and sent to R unit 242.

The input logic 610 and data cell memory 320, as described in more detail below, prevent address offsets from exceeding the size of address offset fields 450. This also helps reduce transmit times associated with transmitting the address offset information to other devices.

Exemplary Processing

Figure 9:
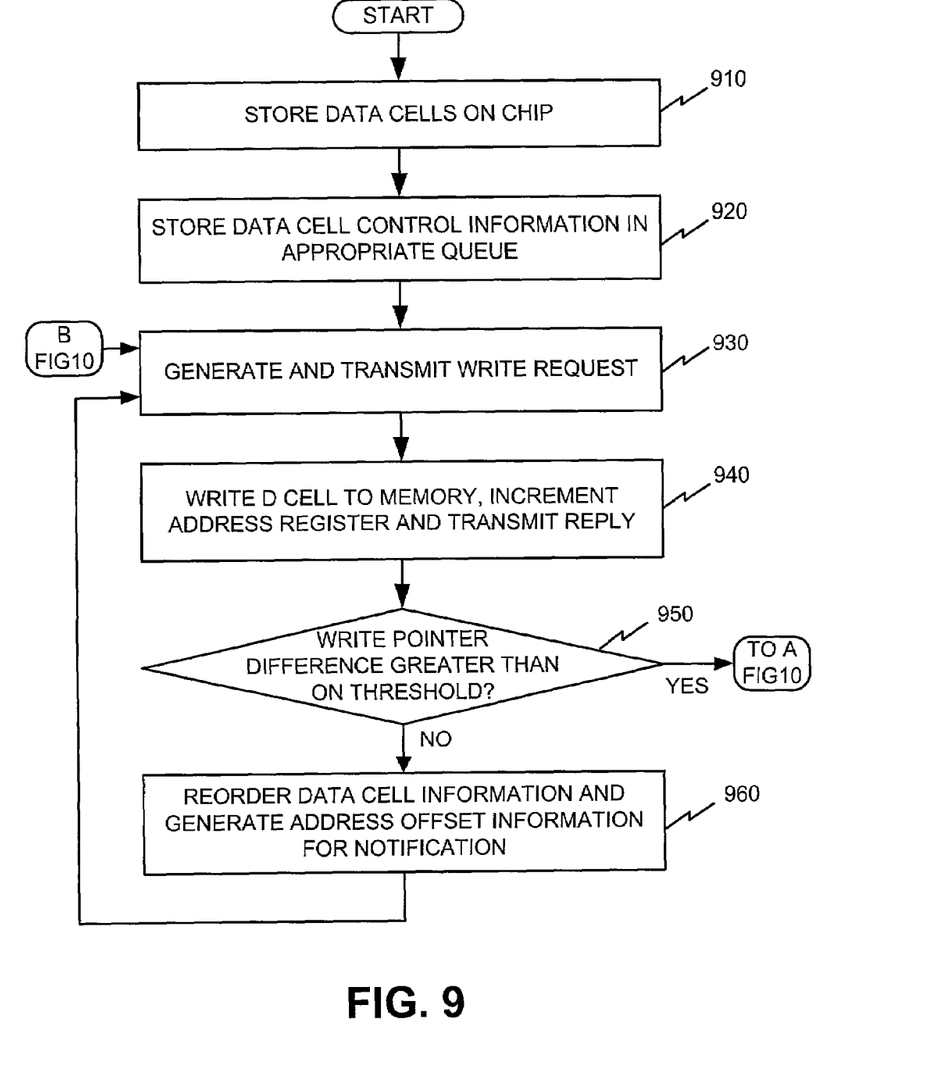
FIGS. 9 and 10 are flowcharts of exemplary processing of a packet according to an implementation consistent with principles of the invention.
Figure 10:
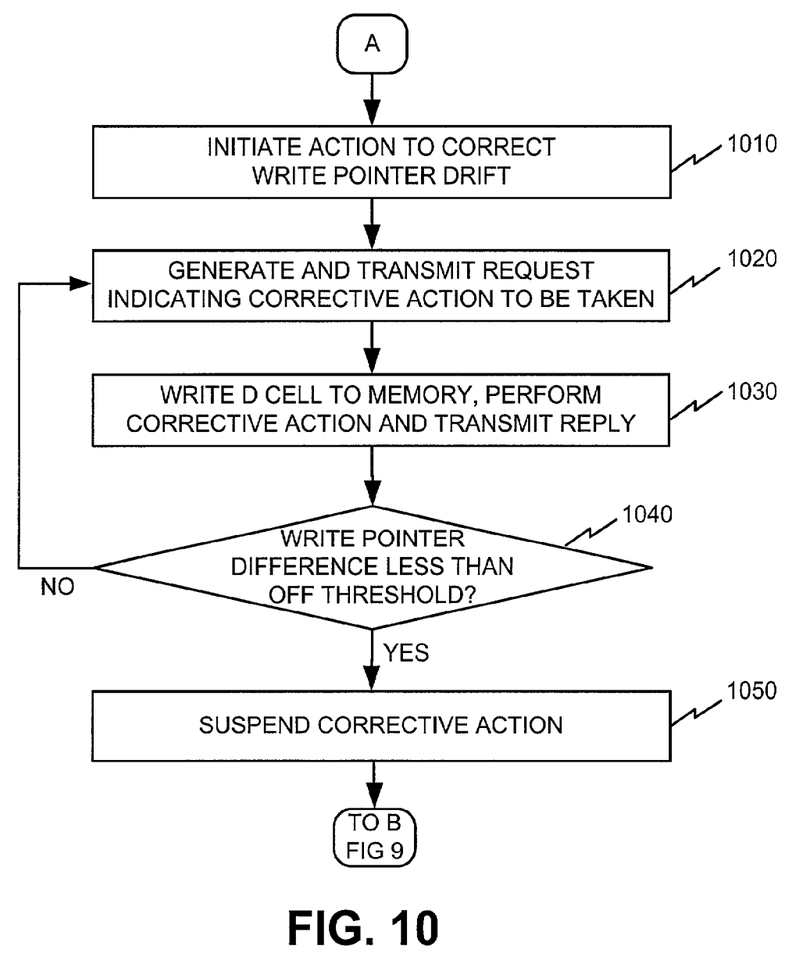

FIGS. 9 and 10 are flowcharts of exemplary processing associated with storing D cells, according to an implementation consistent with principles of the invention. Processing may begin with first I/O logic 236 receiving D cells from L units 232 and 234. As described previously, second I/O logic 238 may also receive D cells from switch fabric 130 for storage in memory system 240. The description below is provided in terms of first I/O logic 236 processing the D cells. It should be understood, however, that second I/O logic 238 may process D cells in a similar manner.

First I/O logic 236 receives the D cells and stores the D cells in cell buffer 710 (act 910). First I/O logic 236 may also store the notifications in a notification buffer. Control logic 720 receives control information, such as sequence number information, associated with the D cells and a pointer identifying the location of the respective D cells in cell buffer 710. Control logic 720 may also receive control information associated with I cells. Control logic 720 may then store the D cell and I cell control information in memory bank queue 730 (act 920). As described previously, control logic 720 may map the sequence number information to identify the particular queue in memory bank queue 730 in which to store the D cell and I cell control information. This enables first I/O logic 236 to "spray" the D cells essentially evenly over memory banks 830.

After the D cell control information is stored in the appropriate queue in memory bank queue 730, request engine 740 dequeues the information in memory bank queue 730, generates a write request and transmits the write request to data cell memory 320 (act 930). The write request includes a sequence number and the D cell. Assume that PFE 120 (FIG. 2) has just started receiving data and, therefore, address registers 820 are all within the range defined by on register 752. In this case, request engine 740 issues a "normal" write request to data cell memory 320. That is, since all the address registers 820 are within the predefined range, no corrective action with respect to one of address registers 820 is required.

Assume that the write request is associated with data from queue B1 in memory bank queue 730. In this case, memory controller 810B receives the write request and identifies the request as a normal write request. Memory controller 810B accesses address register 820B, stores the D cell in memory bank 830B at the location identified by address register 820B and increments address register 820B (act 940). As described previously, in an exemplary implementation, the normal increment value is "1" and memory controller 820B increments address register 820B by "1." Memory controller 810B also transmits a reply to reply engine 750 (act 940). As described previously with regard to FIGS. 7 and 8, the reply includes the write pointer identifying the location of the D cell in memory bank 830B and sequence number information.

Reply engine 750 examines the write pointer included in the reply and determines whether the difference between this write pointer from memory controller 8101B and the most recent write pointers received from memory controllers 810A, 810C and 810D is greater than the value in on register 752 (act 950). Reply engine 750 may include any number of techniques to identify whether the write pointer difference is greater than the value in on register 752. In an exemplary implementation, reply engine 750 may subtract the received write pointer for memory controller 810B from each of the write pointers associated with the other memory controllers 810A, 810C and 820D. Reply engine 750 may select the maximum difference and compare the maximum difference to the value in on register 752. In other implementations, the reply engine 750 may subtract the write pointer for memory controller 810B from an average value of the write pointers for memory controllers 810A, 810C and 810D and compare this difference to the value in on register 752.

When the maximum write pointer difference is less than the value in on register 752, this indicates that memory controller 8101B is within the defined range and no corrective action is necessary. In this case, processing may continue in a normal manner. That is, reply engine 750 forwards the write pointer and sequence number included in the reply to reorder logic 760. Reorder logic 760 reorders the D cell control information and generates address offsets for a data packet that will be included in a notification 400 (act 960). Processing may then return to act 930 where request engine 740 continues to dequeue information from memory bank queue 730, generate write requests and transmit the write requests to data cell memory 320.

When reply engine 750 determines that the difference between the write pointer from memory controller 810B and the most recent write pointers from memory controllers 810A, 810C and 810D is greater than the value in on register 752, however, reply engine 750 signals request engine 740 that corrective action must be taken (act 1010, FIG. 10). As discussed previously, in an exemplary implementation consistent with principles of the invention, the corrective action may require that future write requests associated with memory controller 810B indicate that address register 820B be incremented by "2" after writing a D cell to memory bank 830B. In this case, the write request from request engine 740 may include a control bit that indicates the particular corrective action to be taken. Alternatively, the write request may indicate that address register 820B be incremented by a value greater than "2."

Assume that request engine 740 dequeues another entry in bank B1 in memory bank queue 730. Request engine 740 retrieves the D cell from cell buffer 710 and generates a write request that includes information indicating that corrective action is to be taken (act 1020). Memory controller 810B receives the write request and determines that the request indicates that corrective action is to be taken with respect to correcting write pointer drift. Memory controller 810B writes the D cell to the location identified by address register 820B and also performs the appropriate corrective action (act 1030). For example, in an exemplary implementation, the memory controller 810B increments address register 820B by "2." Memory controller 810B then transmits the write reply to reply engine 750 (act 1030).

Reply engine 750 compares the received write pointer from memory controller 810B to the most recent write pointers associated with memory controllers 810A, 810C and 810D. In an exemplary implementation, the reply engine 750 subtracts the value of the write pointer associated with memory controller 810B from the value of the current write pointers associated with each of the other memory controllers 810A, 810C and 810D (similar to the procedure at act 940). Reply engine 750, however, takes the maximum difference and compares this maximum difference to the value in off register 754. If the maximum difference is less than the value in off register 754 (act 1040), this indicates that the address register 820B is back within the defined range and corrective action is no longer required. Reply engine 750 may then suspend the corrective action associated with further write requests to memory controller 8101B (act 1050). Processing may then return to act 930 where request engine 740 may continue to dequeue information from memory bank queue 730, generate write requests and transmit the write requests to data cell memory 320.

If, however, reply engine 750 indicates that the write pointer difference is not less than the value in off register 754, this indicates that corrective action is still required. In this case, processing associated with memory controller 810B returns to act 1020 and corrective action with respect to memory controller 810B continues until address register 820B is within the defined range.

CONCLUSION

Systems and methods, consistent with the principles of the invention, provide memory access to all requesters while ensuring that data from one requestor does not inadvertently overwrite data associated with another requester. Systems and methods consistent with principles of the invention also limit the size of address offsets associated with a single packet, thereby ensuring that the actual address offsets will fit within the address offset fields. This also ensures that the actual data packets can be reconstructed. In addition, limiting the size of the address offsets saves memory space and time associated with transmitting the address offset information, thereby helping the network device to maintain the required line rates.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, systems and methods have been described for processing packets using a memory that includes four separate memory banks. In other implementations consistent with principles of the invention, the number of memory banks may be greater or smaller. Alternatively, a single memory may be used that is divided into a number of separately addressable portions. Also, while systems and methods have been described in terms of a network device, the present invention may have applicability in other devices where data is dispersed among memory banks.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A system for writing data, comprising:
    a memory configured to store data units;
    at least one memory controller configured to:
        receive a first write request associated with a data unit,
        store the data unit in the memory, and
        transmit a first reply including a first address where the data unit is stored; and
    control logic configured to:
        receive the first reply, and determine whether the first address differs from an address included in at least one other reply by at least a first value.

2. The system of claim 1, wherein the control logic is further configured to:
initiate a corrective action when the first address differs from the address included in the at least one other reply by at least the first value.

3. The system of claim 2, wherein the control logic is further configured to:
suspend the corrective action when a second address included in a second reply differs from an address included in at least one other reply by less than a second value.

4. The system of claim 1, wherein the memory comprises a plurality of memory devices and the at least one memory controller comprises a plurality of memory controllers, the system further comprising:
a request engine configured to:
generate the first write request, and
transmit the first write request to a first one of the memory controllers; and
wherein the first memory controller is configured to determine where to store the data unit associated with the first write request.

5. The system of claim 1, wherein the at least one memory controller is configured to increment its address register by a first predetermined value after a data unit is stored.

6. The system of claim 5, wherein the at least one memory controller is configured to:
receive a second write request indicating that a value in its address register is outside a predetermined range,
store a second data unit associated with the second write request, and
increment its address register by a second predetermined value after the second data unit is stored.

7. The system of claim 6, wherein the at least one memory controller is further configured to:
transmit a second reply including a second address where the second data unit is stored; and wherein the control logic is further configured to:
determine whether the second address differs from an address included in at least one other reply by less than a second value.

8. The system of claim 6, wherein the first predetermined value is less than a second predetermined value.

9. A method for processing data, comprising:
receiving a first write request associated with a data unit;
storing the data unit;
transmitting a first reply including a first address where the data unit is stored; and
determining whether the first address differs from an address included in at least one other reply by at least a first value.

10. The method of claim 9, further comprising:
initiating a corrective action when the first address differs from the address included in the at least one other reply by at least the first value.

11. The method of claim 10, further comprising:
suspending the corrective action when a second address included in a second reply differs from an address included in at least one other reply by less than a second value.

12. The method of claim 9, further comprising:
generating the first write request, the first write request including the data unit;

transmitting the first write request to a first memory controller; and wherein the storing the data unit includes:
determining, by the first memory controller, where to store the data unit.

13. The method of claim 9, further comprising:
incrementing an address register by a first predetermined value after the data unit is stored.

14. The method of claim 13, further comprising:
generating a second write request indicating that a value in the address register is outside a predetermined range;
storing a second data unit associated with the second write request; and
incrementing the address register by a second predetermined value after the second data unit is stored.

15. The method of claim 14, further comprising:
transmitting a second reply including a second address where the second data unit is stored; and
determining whether the second address differs from an address included in at least one other reply by less than a second value.

16. The method of claim 14, wherein the first predetermined value is less than a second predetermined value.

17. A network device, comprising:
a plurality of memory banks configured to store data units;
a plurality of request engines configured to generate write requests, the write requests each including at least one data unit;
a plurality of memory controllers, each memory controller being configured to:
receive a write request,
determine where to store the data unit included in the write request using an address register associated with the memory controller,
store the data unit at a location identified by an address in the address register, and
transmit a reply message identifying the address where the data unit is stored; and
logic configured to:
receive the reply message, and
determine whether the address where the data unit is stored differs from an address included in at least one other reply message by at least a first value.

18. The network device of claim 17, wherein a number of the data units comprise a data packet and each of the plurality of memory controllers is further configured to:
increment the address register after storing the data unit.

19. The network device of claim 17, wherein each of the memory controllers includes an address register.

20. The network device of claim 19, wherein each of the memory controllers is configured to:
receive write requests from the plurality of request engines, and
store data units included in the write requests in a memory bank, the data units being stored at respective locations identified by its address register.

21. The network device of claim 17, wherein the write requests do not include information identifying a particular location in one of the plurality of memory banks.

22. The network device of claim 17, wherein the write requests include information identifying an amount by which the memory controller receiving the write request is to increment the address register.

23. A method for writing data in a network device, comprising:

generating write requests, each write request including at least one data unit, wherein a number of the data units comprise a data packet;

forwarding the write requests to one of a plurality of memory controllers;

determining, by a first one of the memory controllers, where to store a data unit included in a write request using an address register;

storing the data unit at a first address identified by the address register;

determining whether the first address differs from an address associated with at least one other stored data unit by a first value; and initiating a corrective action when the first address differs from the address associated with the at least one other stored data unit by at least the first value.

24. The method of claim 23, wherein the write requests include information identifying an amount by which to increment the address register, the method further comprising:

incrementing the address register by a first value or a second value, based on information included in the write request.

25. A system for writing data, comprising:

a plurality of memory devices configured to store data units, a number of the data units comprising a data packet;

a plurality of memory controllers corresponding to the plurality of memory devices;

a plurality of address registers associated with the plurality of memory controllers, a first one of the memory controllers being configured to:

receive a first data unit, and store the first data unit in a first one of the memory devices, the first data unit being stored at a location identified by a first one of the address registers; and control logic configured to:

determine a difference between a value of the first address register and a value of at least one of the other address registers, and determine whether the difference is greater than a first threshold.

26. The system of claim 25, wherein the control logic is further configured to:

generate, when the difference is greater than the first threshold, a signal indicating that the first address register is outside a predetermined range, and transmit the signal to the first memory controller.

27. The system of claim 26, wherein the first memory controller is further configured to:

receive a second data unit, store the second data unit in the first memory device, and increment the first address register by a value of at least two, in response to receiving the signal from control logic.

28. The system of claim 27, wherein the control logic is further configured to:

continue incrementing the first address register by a value of at least two until a maximum difference between a current value of the first address register and a current value of each of the other address registers is less than a second threshold.

29. A system for writing data, comprising:

a plurality of memory banks configured to store data units, a number of the data units comprising data packets, wherein at least some of the data units associated with a first data packet are stored in different memory banks;

a write request engine configured to generate write requests, each write request including a data unit;

a plurality of memory controllers corresponding to the plurality of memory banks, each of the memory controllers including an address register, a first one of the memory controllers being configured to:

receive a first write request, store the data unit included in the first write request in a first one of the memory banks, increment its address register, and transmit a first reply including a write pointer, the write pointer identifying an address where the data unit is stored; and control logic configured to:

receive the first reply, determine a difference between the write pointer in the first reply and write pointers included in replies from each of the other memory controllers, identify the maximum difference, and determine whether the maximum difference is greater than a first threshold.

30. The system of claim 29, wherein the control logic is further configured to:

transmit a signal to the write request engine indicating that the maximum difference is greater than the first threshold.

31. The system of claim 30, wherein the write request engine is further configured to:

generate a second write request, the second write request indicating that the address register is to be incremented by a value of at least two, in response to receiving the signal from control logic, and transmit the second write request to the first memory controller.

32. The system of claim 31, wherein the control logic is further configured to:

continue generating write requests indicating that the address register is to be incremented by a value of at least two until a determined difference between a write pointer in a reply associated with the first memory controller and a write pointer included in a reply associated with each of the other memory controllers is less than a second threshold.

33. A system for writing data in a network device, comprising:

means for storing data cells in one of a plurality of memory banks, a number of the data cells comprising data packets and at least some of the data cells being associated with a first data packet being stored in different memory banks;

means for determining whether a pointer associated with any one of the memory banks is outside a predetermined range; and means for adjusting the memory bank that is outside the predetermined range.

* * * * *